United States Patent [19]

Guinot et al.

[11] Patent Number: 4,653,793

[45] Date of Patent: Mar. 31, 1987

[54] MULTIPLE POINT CONTACT GRIPPER

[75] Inventors: Jean-Claude Guinot, Paris; Jean-Paul Lallemand, Poitiers; Denis Murguet, Ruelle; Saïd Zeghloul; Philippe Bidaud, both of Poitiers, all of France

[73] Assignee: La Calhene Société Anonyme, Bezons, France

[21] Appl. No.: 641,507

[22] Filed: Aug. 16, 1984

[30] Foreign Application Priority Data

Sep. 2, 1983 [FR] France ................................ 83 14084

[51] Int. Cl.$^4$ ................................................. B66C 1/46
[52] U.S. Cl. ...................................... 294/86.4; 294/88; 294/106; 294/902; 414/751; 901/31; 901/39; 901/79
[58] Field of Search ............... 294/86.4, 88, 116, 902, 294/95, 106, 97, 115; 414/618, 621, 729, 730, 736, 741, 744 A, 751; 901/31, 37, 39

[56] References Cited

U.S. PATENT DOCUMENTS

| | | | |
|---|---|---|---|
| 3,061,357 | 10/1962 | Wright | 294/106 |
| 3,901,547 | 8/1975 | Skinner | 294/88 |
| 4,546,681 | 10/1985 | Owsen | 294/902 |

FOREIGN PATENT DOCUMENTS

| | | | |
|---|---|---|---|
| 0036912 | 10/1981 | European Pat. Off. | |
| 3100401 | 11/1981 | Fed. Rep. of Germany | |
| 2277025 | 1/1976 | France | 294/902 |
| 2375962 | 7/1978 | France | |
| 2101078 | 1/1983 | United Kingdom | |

Primary Examiner—James B. Marbert

[57] ABSTRACT

A gripper has n pseudospherical contact pads providing a point contact with an object to be gripped. The sum of the degrees of liberty existing between the object and each of the pads taken separately is less than, or preferably equal to, $6(n-1)-1$. Moreover, the assembly constituted by the object, the pads, the fingers and the frame is isotatic, which means that the total number of degrees of liberty of this assembly is strictly equal to $6(n-1)$. Strain gauges placed on the fingers permit determining the tensor of the efforts exerted by the object on the gripper. An orientation of the object gripped can be accomplished by providing the pads with additional degrees of liberty controlled by independent actuators.

9 Claims, 11 Drawing Figures

MULTIPLE POINT CONTACT GRIPPER

The present invention has as its object a gripper having multiple finger pads mounted on fingers adapted for displacement with respect to a base piece, in order to grip an object in a stable manner.

Very many gripping means are known which are used with various tools, and particularly as a terminal organ of a manipulator or programmed robot.

Also known are hand prostheses using more or less advanced means for reproducing the human grasp.

In the great majority, these grippers make broad-surface contact with the objects to be gripped.

The most popular grippers have two fingers which do the gripping either while remaining parallel to one another, or while pivoting about two shafts affixed to a base piece. These two fingers generally terminate in planar, in some cases resilient, contact surfaces, permitting ordinary objects to be held immobile by making broad-surface or linear contact on each surface.

In one variant of these most popular grippers, at least one of the gripping fingers terminates in a V-shaped jaw permitting a better grip on cylindrical objects or objects of elongated shape. In some grippers of this type, V-shaped jaws are disposed in a crossed manner, allowing the gripping of objects of elongated shape in two different directions.

Aside from these relatively versatile grippers, pincer jaws of special shape adapted to objects to be manipulated are also made. Such pincers are used generally in all automatic machines.

When it is necessary to know the interaction efforts between the object gripped and another object, for example in conjunction with the insertion of one object into another or with a forcible mechanical assembly, it is desirable to measure three components of force and three components of torque between the gripper, which is affixed to the gripped object, and the manipulator arm or the robot.

Generally, the six components of the tensor of force thus defined are measured with the aid of a single system interposed between the gripper and the articulation of the wrist of the manipulator or of the robot. However, the use of sensors of six degrees of liberty interposed between the wrist and the gripper involves many difficulties, resulting first of all from the lengthening of the gripping member at this level. These difficulties also result from the separation between the point of application of the efforts, which is situated at the center of gravity of the object or at its point of contact with another object, and the point of measurement of the strain gauge generally situated at some ten centimeters up from the articulated system.

In the particular case of bilateral command manipulators or stress feedback manipulators, the forces and the torques are measured directly at the articulations. In this case, the measurement is performed directly at the source, that is, at the point where the different movements or degrees of liberty of the manipulator are realised. It is thus possible to recreate, on a master arm, or in a control system, the resultant force vector and the final resultant torque vector, or combined efforts of interaction between the end of the manipulator and its environment, that is, between the object held by the gripper and this environment. This particular case is, however, specific for manipulators known as master-slave stress feedback manipulators. Furthermore, it is to be noted that the mechanisms used must distinguish between the efforts actually applied externally of the system constituted by the manipulator and by the object gripped, and the internal efforts such as the effort which is necessary for the holding and for the gripping of the object.

Otherwise, all the gripping means mentioned above have the effect of holding the object immobile in the gripper, while requiring very percise positioning. Indeed, when the object itself is connected to its environment by constraints, a bad positioning of the gripper results in shifting the object as it is gripped, or in generating parasitic efforts at that time.

The object of the invention is precisely a multiple point contact gripper performing point contacts or pseudo-point contacts with the object to be gripped, in order to improve grip quality, permit the sensing of the efforts in the fingers of the gripper as closely as possible to the points of contact, permit the object to be gripped without displacing it or exercising parasitic efforts, and lastly permit slight movements of the object being held, with respect to the gripper frame, without movement of the fingers with respect to the frame.

To this end, in accordance with the invention, a gripper is proposed, having n pad devices mounted on fingers adapted for displacement with respect to a frame, so as to grip an object of any three-dimensional shape in a stable manner, characterized in that the said pad devices have pseudo-point-contact surfaces with the said object, the sum of the degrees of liberty existing between the latter and each of the contact surfaces being no more than equal to $6(n-1)-1$, and the object gripped, the pad devices, the fingers and the frame constituting an isostatic assembly such that the sum of the degrees of liberty of all of the connections of this assembly is strictly equal to $6(n-1)$.

Accordingly as the number of degrees of liberty between the pad devices and the object gripped is equal to or less than $6(n-1)$, the condition of isostaticity of the assembly comprising the gripped object, the pad devices, the fingers and the frame therefore requires that one or more of the fingers have an additional degree of liberty with the frame.

This additional degree of liberty must be added to the devices controlling the closing and the opening of the fingers. In fact, these devices are irreversible mechanisms, such that it can be considered that they do not introduce any additional degree of liberty when the object is gripped and held between the pad devices.

In accordance with an important aspect of the invention, an additional degree of liberty can be introduced into one or more of the finger-to-frame links, to satisfy the condition of isostaticity, by transmitting the efforts between the gripping device and the finger through the medium of a resilient element deformable in the direction corresponding to the closing and opening of the fingers. Thus, if the closing is controlled by a movement of the finger, the resilient element deforms in the direction defined by this movement. On the other hand, if the closing is controlled by a pivoting movement of the finger, the transmission of the closing effort is made by a resilient torsion element about the pivot axis.

It is to be noted that the presence of a means such as a spring in the finger-to-frame junction makes it possible, unlike a cinematically equivalent bilateral junction, to assure that the effort exerted by the pad device on the object always has a positive component orientated towards the interior of the object perpendicularly to the surface of the latter, at the point of contact between the object and the corresponding pad device. This property is necessary for the good holding of the object in the gripper.

According to a preferred embodiment of the invention, the condition of isostaticity of the assembly consisting of the static gripper permits giving the gripper six independent degrees of liberty for the object gripped, an independent motor permitting control of each of the movements corresponding to these six degrees of liberty. Indeed, this condition permits moving the object without slippage and without loss of contact at the points of contact between the pad devices and the object, without displacement of the fingers of the gripper with respect to the frame. Thus, a veritable "gripper-manipulator" is achieved, whose mounting at the end of the carrier of a robot permits making any necessary small-amplitude changes of orientation and position needed, for example, for the fitting of two pieces one into the other.

To simplify the explanation, the expressions, "tip devices of three, four or five degrees of liberty," will be used to refer to gripper pad devices permitting three, four or five movements or degrees of liberty of the object gripped, with respect to the pad device considered separately.

Thus, when the invention concerns a gripper of three contact pads, this gripper will include one pad device of three degrees of liberty and two pad devices of no more than four degrees of liberty, and at least one junction of one degree of liberty between the fingers and the frame, such that the said sum of the degrees of liberty is equal to 12.

In a preferred embodiment of such a gripper with three finger pad devices, the gripper includes one pad of three degrees of liberty and two pads of four degrees of liberty, one link of one degree of liberty being provided between one of the fingers and the frame, a three-dimensional effort detector and one at least bidimensional effort detector being mounted on the fingers bearing respectively the pad of three degrees of liberty and the pads of four degrees of liberty.

In the case where the invention concerns a gripper of four contact pads, this gripper has three pad devices of no more than four degrees of liberty and one pad of no more than five degrees of liberty, and at least one link of one degree of liberty between the fingers and the frame, such that the said sum of the degrees of liberty is equal to 18.

In a preferred embodiment of such a gripper of four contact pads, this gripper includes three pad devices of four degrees of liberty and one pad device of five degrees of liberty, one link of one degree of liberty being provided between one of the fingers and the frame, one at least bidimensional effort detector and one at least unidimensional effort detector being mounted on the fingers bearing respectively the pad devices of four degrees of liberty and the pad device of five degrees of liberty.

Each pad device of three degrees of liberty can of course be made in the form of a pseudospherical piece affixed to the corresponding finger. The term, "pseudospherical piece", is to be understood to mean any piece having in its useful part either the shape of a sphere or torus, or a shape approximating same.

In a comparable manner, each pad device of four or five degrees of liberty preferably includes a pseudospherical piece mounted, according to the case, with one or two degrees of liberty on the corresponding finger.

In practice, the pad devices of four degrees of liberty can be made in different ways. Thus, the pseudospherical piece can of course be either a body of revolution mounted rotatably on a shaft passing through its axis of revolution, or it can be mounted in a sliding and nonrotating manner on a rod integral with the corresponding finger, resilient means being then provided between the piece and the finger in order to bias the pseudospherical piece toward a central part of the rod. The pseudospherical piece can also be connected to the corresponding finger by two parallel leaf springs of the same length defining a deformable parallelogram.

In a comparable manner, the pad devices of five degrees of liberty can also be made in different ways. Thus, the pseudospherical piece can be constituted by a ball mounted in a spherical bearing. The pad device can also be constituted in the same manner as a pad device of four degrees of liberty, the pseudospherical piece having furthermore, according to the case, a supplementary degree of liberty of rotation about its axis of revolution or of translation. Lastly, the pseudospherical piece can also be connected to the corresponding finger by two pairs of parallel leaf springs of the same length defining two parallelograms deformable in two orthogonal directions.

According to another aspect of the invention making it possible to contact the object successively at a plurality of points where it stands, and to grip it without moving it or exercising any parasitic effort, independent means are provided for moving each of the fingers of the gripper with respect to the frame by which the gripper is affixed to the end of the robot's carrying means.

Different embodiments of the invention will now be described, in reference to the appended drawings, wherein.

Figure 8:
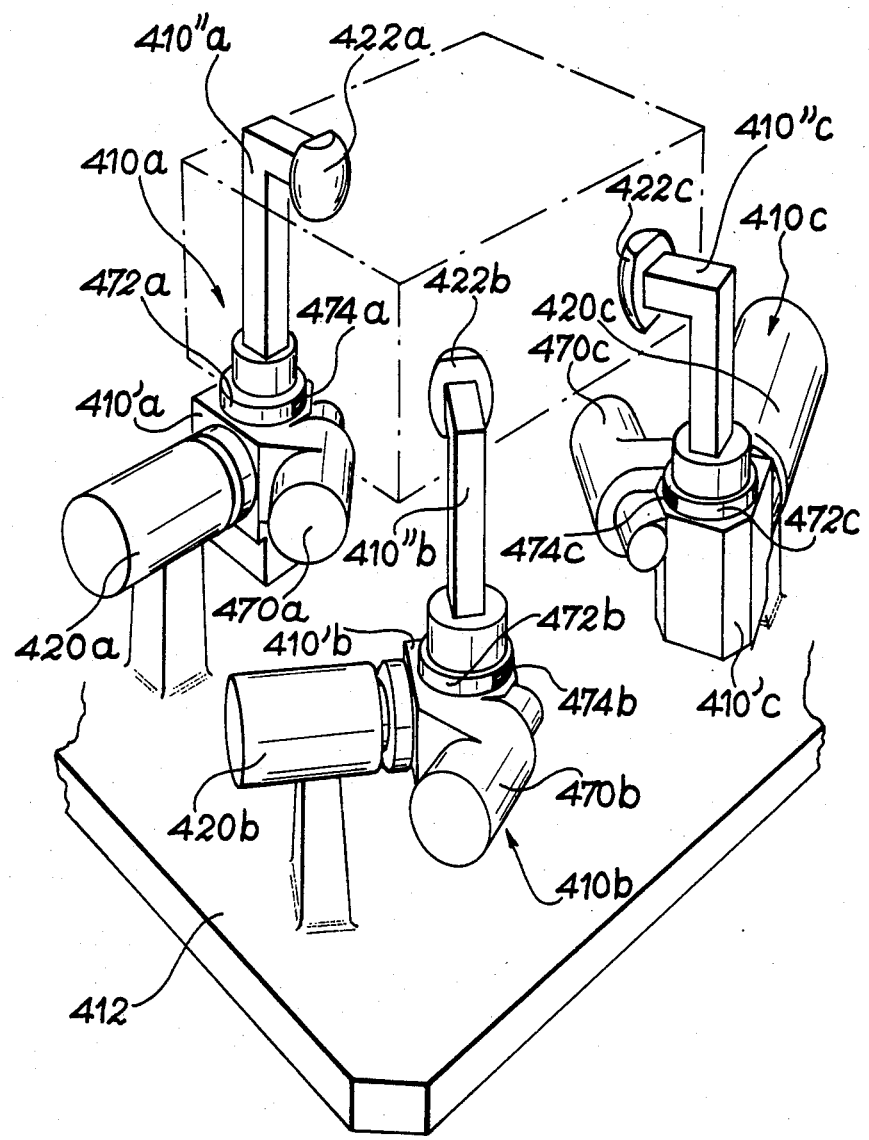
Figure 9:
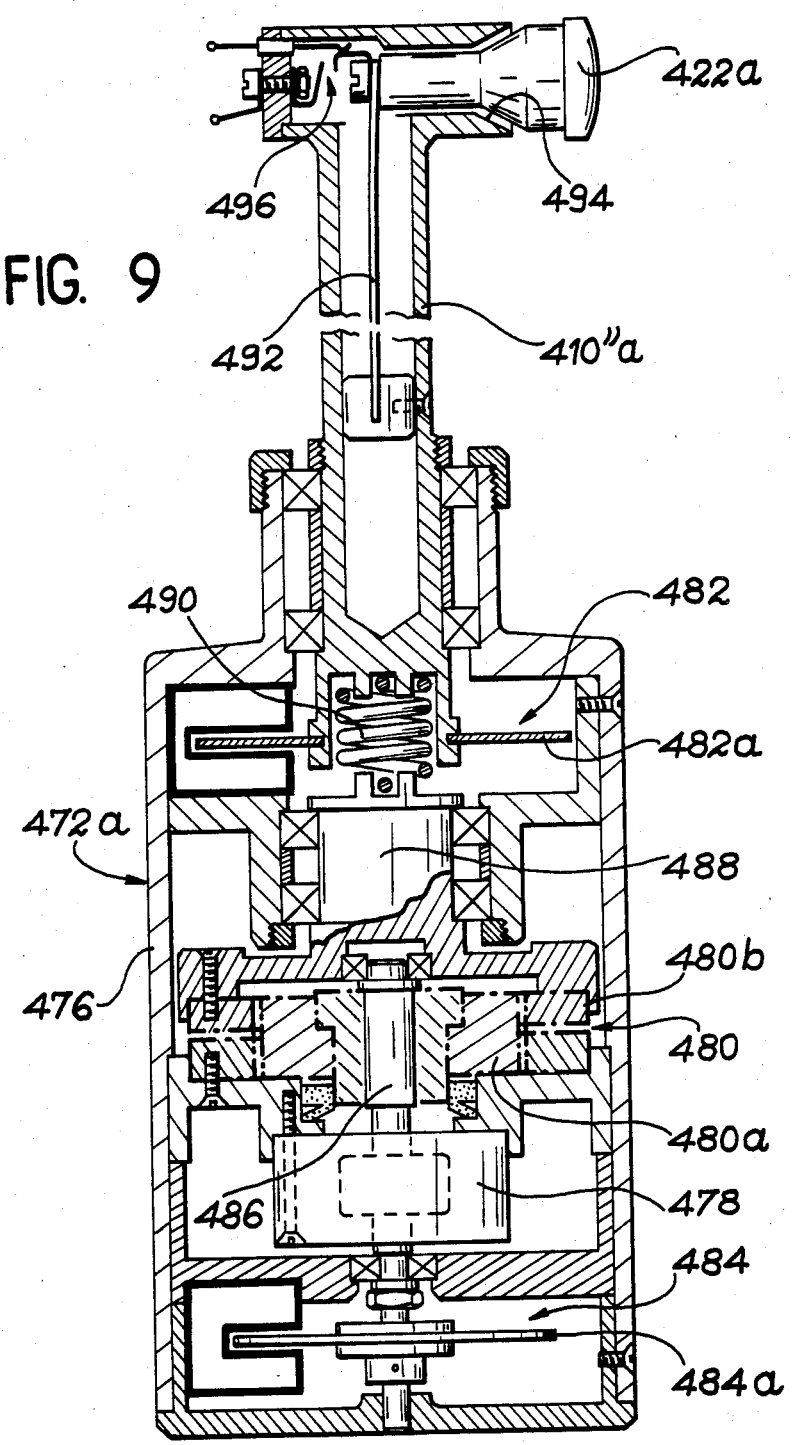

FIG. 8 is a perspective view showing diagrammatically an isostatic gripper in accordance with the invention, the fingers of which define six additional degrees of liberty permitting the positioning and orientation of the object gripped, with a low amplitude with respect to the structure of the gripper, and FIG. 9 is a cross-sectional view of a portion of one of the fingers of the gripper of FIG. 8 incorporating a motor-reducer unit controlling the movement of the pad in one of the additional degrees of liberty.

Figure 1:
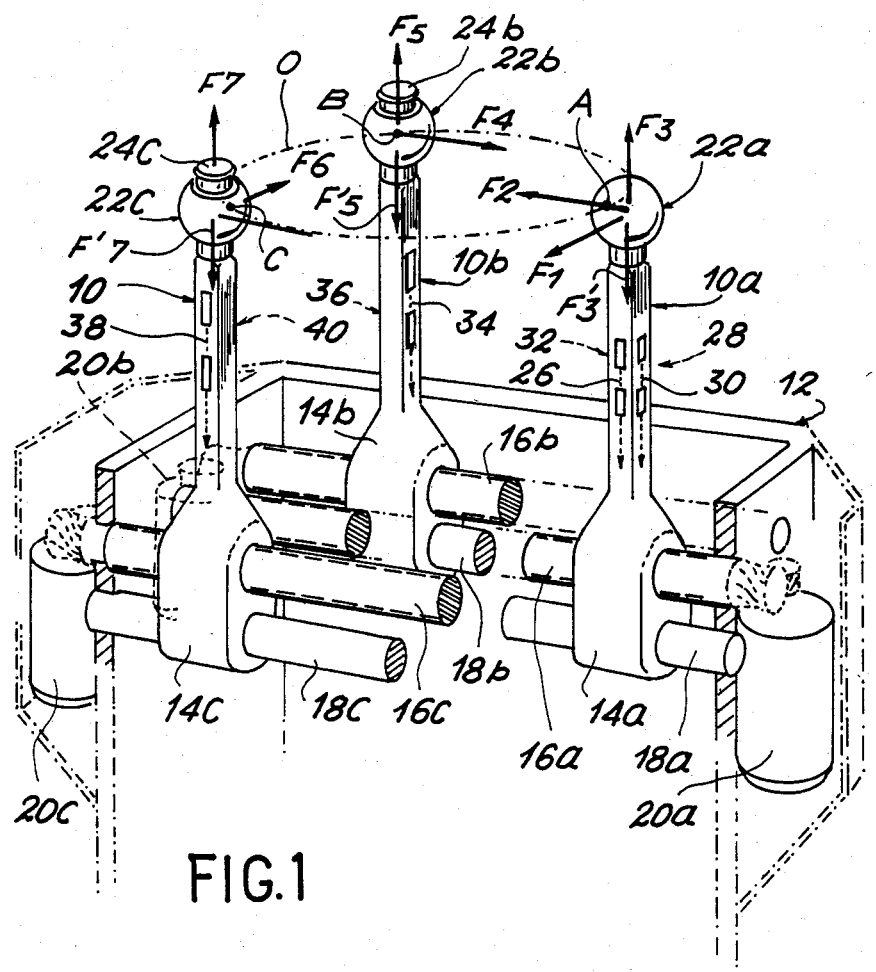
FIG. 1 represents in perspective a tridigital gripper having three contact pads made in accordance with the invention.

In order to illustrate a first embodiment of the invention, a tridigital gripper of three contact pads has been represented in FIG. 1, each contact pad defining a point contact or pseudo-point contact. This gripper includes three straight fingers 10a, 10b and 10c parallel to one another, of square cross section and of the same length. These fingers are mounted in a movable manner on a base piece or frame 12 by which the gripper is affixed to the manipulator or robot. To this effect, each finger 10a, 10b and 10c is provided, at the base 12 end, with a guiding and driving piece 14a, 14b and 14c, respectively. Each of these pieces 14a, 14b and 14c has a nut in which there is accommodated a screw 16a, 16b, 16c, and a bore which accommodates a guiding rod 18a, 18b and 18c, respectively.

In the embodiment shown in FIG. 1, the screws and the guiding rods are parallel to one another and perpendicular to the fingers 10a, 10b and 10c. They thus define parallel displacements of the latter, which are operated by three independent motor-reducers 20a, 20b and 20c driving the screws 16a, 16b and 16c. The screws 16a, 16b, 16c, the guiding rods 18a, 18b, 18c, and the motor-reducers 20a, 20b and 20c, are mounted on the base piece 12. Each of the fingers 10a, 10b and 10c can thus move independently of the other fingers.

Preferably, and as shown in FIG. 1, one of the screws, such as screw 16a, and the corresponding rod 18a, are situated respectively at equal distance between the other two screws 16b and 16c and between the other two guiding rods 18b and 18c.

In accordance with the invention, each of the fingers 10a, 10b and 10c bears at its end a gripping pad 22a, 22b and 22c, respectively. Each of these pads defines an external spherical or pseudospherical surface defining, with the object O to be gripped, point contacts or pseudo-point contacts with friction, A, B and C. These three points of contact define a deformable triangle situated virtually in the end plane of the three fingers, i.e., in a plane perpendicular to the fingers.

The point contacts defined by the pads 22a, 22b and 22c are friction contacts which can be obtained in practice by making these pads of a material having a high coefficient of friction, such as a more or less hard synthetic elastomer, or knurled pieces of metal.

With the structure that has just been described, it can be seen that it is possible, by acting on each of the motor reducers 20a, 20b and 20c, to bring each finger independently toward the object to be gripped, until the corresponding pad comes in contact with it, without applying pressure to it. On account of the triangular arrangement of the pads, and the friction existing at the points of their contact with the object, it is then possible to act on any of the three fingers to cause the object to be gripped by the gripper.

If one assumes, as shown in FIG. 1, that the pseudospherical pad 22a is affixed to the end of the finger 10a, it can be seen that, if the object to be gripped is only in contact with this pad 22a, it has three degrees of liberty which can be defined as follows:

a pivoting of the object about an axis passing through the center of the pad 22a and through the contact point A;

two rolling movements of the object on the pad, equivalent to two other pivoting movements of the object about two axes passing through the center of pad 22a and perpendicular to one another and to the first axis.

Assuming now that the pad 22b is likewise affixed to the end of the finger 10b, it can be seen that contact between this pad 22b and the object already in contact with pad 22a will result in complete immobilization of the object, except for the possibility of its pivoting on an axis passing through the two points of contact A and B. If a tightening effort is then made, there will be an abutment along this axis and a tightening stress preventing the object from transmitting its pressure to the third pad 22c if the latter is not in contact, unless a slippage of the object on the pads occurs.

On the other hand, if it is assumed, in accordance with a preferred embodiment of the invention represented in FIG. 1, that the pad 22b is mounted for rotation on an axis 24b affixed to the end of the finger 12b and situated in the prolongation of the latter, the application of a tightening effort to one or the other of the pads 22a and 22b enables the tightening pressure to be transmitted to the third pad 22c, without breaking the frictional contact between the object and the pads 22a and 22b.

The reasoning which has just been applied with regard to the pads 22a and 22b can also be applied to the pads 22a and 22c. Consequently, and still in accordance with a preferred embodiment of the invention, the pad 22c is also mounted for rotation on a shaft 24c affixed to the end of finger 10c, in the prolongation of the latter, for example.

In the preferred embodiment of the invention represented in FIG. 1, the three-contact-point gripper therefore includes a pseudospherical contact pad 22a of three degrees of liberty and two contact pads 22b and 22c having one additional degree of liberty, that is, four degrees of liberty in contact with the object. These four degrees of liberty correspond to the three degrees of liberty which the object has when it is in contact with a fixed sphere such as the sphere 22a, plus the rotation of pad 22b or 22c and of the object which is in contact therewith about the axis 24b or 24c.

Thus, the application of a tightening effort to any one of the three fingers leads to a harmonious distribution of this effort to the three points A, B and C at which the object is connected to the gripper. In a gripper thus constructed, there exists, therefore, only one strain, which is connected with the tightening.

On the other hand, as seen above, when two of the pads are fixed, relative strains between the two corresponding fingers are added to the strains due to the tightening. Also, additional strains are introduced among the three fingers when the three pads are fixed. It is for this reason that, although the invention equally relates to the case in which two or three pads are fixed, its preferred embodiment relates to the case in which one of the pads permits three degrees of liberty while the other two permit four degrees of liberty. In this case the gripper defines a total of eleven degrees of liberty at the points of contact. These eleven degrees of liberty satisfy the formula according to which the total number of degrees of liberty existing between the gripped object and each pad of a gripper of n points of contact is equal to $6(n-1)-1$.

The subtraction of 1 from the expression $6(n-1)$ corresponds to the fact that the gripper must have at least one strain in order to permit the gripping of the object. As it has been seen above, two or three strains can exist if one or two of the pads of four degrees of liberty are replaced by pads of three degrees of liberty (fixed pseudospherical pads).

If the gripper as a whole, that is, the assembly constituted by the object gripped, the contact pads, the fingers and the frame, is now considered, it must in accordance with the invention satisfy an additional condition, which is to be isostatic. This condition is defined by the fact that the sum total of the degrees of liberty of all of the connections of this assembly is equal to $6(n-1)$.

In the case represented in FIG. 1, where the sum of the degrees of liberty of the connections between the pads and the object gripped, the condition of isostaticity therefore requires introducing an additional degree of liberty at one of the fingers. If the gripper has two or three strains, the condition of isostaticity requires introducing an additional degree of liberty into two or three fingers, respectively.

It was mentioned before that the mechanisms formed by the gripping devices are irreversible, so that the fingers-to-frame connections can be considered as connections of no degree of liberty once the object is gripped. The additional degree of liberty must therefore be obtained by means of a resilient element which is deformable in the direction of movement corresponding to the tightening, this element being introduced into the corresponding connection. In the case of FIG. 1, such an element is placed, for example, between the piece $14a$ and the nut which it supports, in order to permit a relative movement parallel to the rod $18a$ of finger $10a$ with respect to the frame 12 when the object O is gripped between the pads $22a$, $22b$ and $22c$.

It can be seen that the preferred embodiment of the invention in which the gripper introduces only one tightening strain is particularly adapted to the case in which the invention has two complementary aspects which are now going to be described.

Thus, when the only strain in the system constituted by the gripper and the object held is the tightening, it is possible to measure the efforts applied to the object-and-gripper assembly by the environment by placing strain gauges on the square base prism surfaces constituting each of the fingers $10a$, $10b$ and $10c$.

As shown in FIG. 1, a first gauge bridge 26, 28 (only gauge 26 being visible) is placed on the two opposite faces of finger $10a$ and a second gauge bridge 30, 32 (only gauge 30 being visible) is placed on the other two faces of this finger. The gauge bridge 26, 28, permits measuring the effort indicated by the arrow F1 orthogonal to the screw $16a$. The second gauge bridge 30, 32, permits measuring the effort indicated by arrow F2 perpendicular to the arrow F1, that is, parallel to the screw $16a$. The point of measurement of the efforts F1 and F2 is constituted by any point situated along the axis of the finger $10a$, particularly through the center of the pad $22a$, as represented in FIG. 1. It is clear that the separation between this point of measurement of efforts F1 and F2 and the point of contact A of the pad on the object is small, because it is on the order of the radius of the pseudospherical pad $22a$. For this reason, the radius of the pad about the axis of the fingers is as small as possible, particularly with respect to the section ABC of the object. The precise knowledge of points ABC is possible when the geometrical shape of the object is chiefly a simple geometrical shape.

The stability of the grip requires in plane ABC that the friction angle is not exceeded at A, and, outside of this plane, at none of the three points ABC. It can thus be important to use toroidal pads of an olive-like shape, for the gripping of cylindrical objects parallel to the axis of the fingers.

Furthermore, by combining the gauge bridges 26, 28, and 30, 32, it is easy to measure the effort applied to the finger $10a$ in the axial direction, according to the arrow F3 or F'3.

On account of the unilateral nature of the friction forces existing between the pad $22a$ and the object to be gripped, the forces F1 and F2 are always directed towards the other fingers. On the other hand, the axial force can assume values in the direction of traction F3 or in the direction of thrust F'3.

If similar strain gauge systems are placed on the fingers $10b$ and $10c$ of the gripper of FIG. 1, nine forces can therefore be measured. There is then redundancy between the number of measurements made and the need to know seven forces in order to deduct therefrom the tightening and the combination ["torseur"] of the efforts that may be applied by the object to the gripper. Recall that this combination of efforts ["torseur"] corresponds, aside from any tightening of the object, to the resultant force and to the resultant torque applied by the object to the gripper by reason of gravity and/or strains of contact between the object and the environment. It will be understood that knowledge of the geometry of the contact points A, B and C makes it possible to deduce, from the knowledge of six forces, the combination of efforts thus defined.

In the particular embodiment shown in FIG. 1, the three fingers $10a$, $10b$ and $10c$ being parallel and their vectors of displacement being likewise parallel, the nine forces thus measured are all parallel in pairs to one another, and this makes it possible to compute the combination of efforts in a simple manner. Furthermore, the additional degree of liberty enjoyed by the pads $22b$ and $22c$ permits making measurements of redundant efforts which are not the object of strains connected with the relative movements among the fingers. The combination of efforts can thus be more easily determined.

As it has been represented in FIG. 1, it is also possible not to perform redundant effort measurements. In this case, and if the three-dimensional measurements on finger $10a$ described above are preserved, the measurement on finger $10c$, for example, can be limited to a measurement of the deflection F4 parallel to the screw $16b$ by means of a gauge bridge 34, 36 (only gauge 34 being visible) comparable to the gauge bridge 30, 32. The gauge bridge 34, 36, is also used for measuring the longitudinal effort F5, F'5, transmitted to the finger $10b$ by the pad $22b$. In comparable fashion, finger $10c$ can be equipped with a gauge bridge 38, 40 (only gauge 38 being visible) disposed comparably to the gauges 26 and 28, so as to permit the measurement of the deflection F6 perpendicular to the screw $16c$, and of the longitudinal effort F7 or F''7 exerted on the finger $10c$. Seven measurements are thus made, making it possible to reconstruct the combination of efforts and the seventh force which corresponds to the tightening proper.

The foregoing description makes it possible to understand the importance of the features of the invention by means of which measurements of efforts can be made in a simple manner, virtually on contact with the object, avoiding the well-known complications of measuring devices of six degrees of liberty placed between the wrist of the manipulator or robot and its gripper.

In the embodiment described with reference to FIG. 1, an additional degree of liberty has been given to the pads $22b$ and $22c$ by mounting them rotatably on the axes of rotation 24b and 24c. The construction of pads which confer on the object with which they are in contact four degrees of liberty is not, however, limited to this system.

Figure 2A:
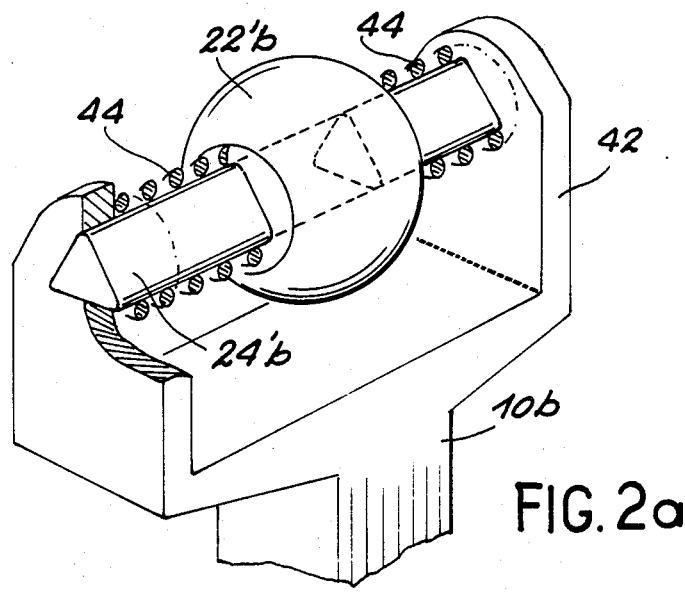
FIGS. 2a and 2b are perspective views on a larger scale illustrating two variant embodiments of the contact pads of four degrees of liberty used in the gripper of FIG. 1.

Thus, it can be seen by referring to FIG. 2a that the fourth degree of liberty can be obtained by mounting a pseudospherical pad such as 22'b in a sliding but not revolving manner on a straight rod 24'b of prismatic cross section (triangular in the figure) affixed to the end of the corresponding finger 10b on a fork 42. The rod 24'b is disposed on an axis of revolution of the pad 22'b, like the rods 24b and 24c in FIG. 1. When the slide rod 24'b is perpendicular to the finger 10b as illustrated in FIG. 2a, an additional degree of liberty is conferred upon the pad 22'b, which can be compared to that achieved by the rotation of pad 22b in FIG. 1.

In the embodiment shown in FIG. 1, as in the embodiment in FIG. 2a, the contact obtained between the pads of four degrees of liberty and the object is always situated in the same plane, regardless of where the contact point is situated.

To prevent the pad 22'b from colliding hard against one of the ends of the fork 42, preferably two compression springs 44 are placed about the rod 24'b, one on each side of the pad 22'b. The latter is thus automatically recentered to the central portion of the rod when it is not in contact with an object. In all cases it thus has a certain travel when required by the tightening or the slight displacements of the object when it is seized by the gripper.

Figure 2B:
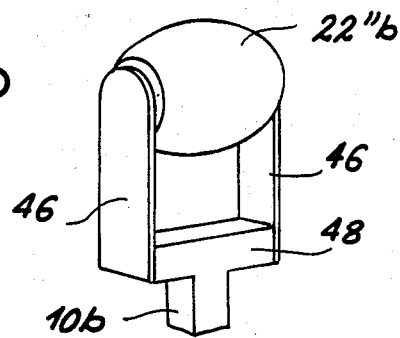

Considering the difficulties which, in the variant shown in FIG. 2a, are involved in making an adjustment between a rod of prismatic cross section and a bore of the same cross section formed in the pad, another variant has been represented in FIG. 2b, of a pad of four degrees of liberty which does not have this shortcoming.

In this case, the pseudospherical pad 22"b is connected to the end of the finger 10b by two parallel leaf springs 46 of the same length. More precisely, the leaf springs are affixed one on each side of the pad 22"b, on an axis of revolution of the latter, and they are affixed to a block 48 integral with the end of the finger 10b. The two springs 46 thus define, with the axis of pad 22"b and with the block 48, a deformable parallelogram. The pad 22"b therefore has an additional degree of liberty comparable to the additional degree of liberty of pad 22'b in FIG. 2a, although its movement takes place on an arc, not on a straight line.

In the gripper of FIG. 1, therefore, the pads 22b and 22c with the rotatory axes can be replaced by pads made in accordance with FIG. 2a or with FIG. 2b. In this case, to prevent the gripping from having the effect of directly shifting the pads in the corresponding direction, the additional degree of liberty obtained in the embodiments of FIGS. 2a and 2b must never be perpendicular to the surface of the object as regards its being gripped. This condition is fulfilled if the axis of the additional degree of liberty thus obtained is oriented perpendicular to the direction of movement of the fingers.

In accordance with another aspect of the invention, it is possible to make the fixed pad 22a in the form of a pad rotatably mounted on an axis parallel to the axes 24b and 24c and to produce the rotation of the pad by means of a rotatory actuator. As long as this actuator is not employed, the pad 22a behaves like a fixed pad, and all that has been said above in conjunction with FIG. 1 remains valid. When an object is clutched in the gripper, the operation of this actuator has the effect of rotating pad 22a about an axis parallel to the axes 24b and 24c, which produces a rotation of the piece in the gripper. Assuming that this piece is a cylinder with an axis parallel to the fingers of the gripper, the operation of the actuator thus makes it possible to rotate the piece on its axis.

In a comparable manner, if the pads 22b and 22c are mounted so as to be able to shift along their axes 24b and 24c when the appropriate linear actuators are operated, two different orientations of the plane of contact A, B and C of the object O can be controlled.

Thus, if an additional degree of liberty controlled by an appropriate actuator is added to each of the pads 22a, 22b and 22c, it can be seen that it is possible to move the object after it has been seized by the gripper, in three degrees of liberty of orientation. In the most general case, when the object is not a cylinder with its axis parallel to the fingers 10a, 10b and 10c, it is then essential that one of the three fingers, using the information furnished by the detectors, maintain the contact and the grip during these movements which, essentially, are slow movements of little amplitude.

The foregoing description shows that the gripper of the invention permits, on the one hand, a better adaptation of strain detectors to the fingers of the gripper and, on the other hand, the addition of orientational movements on axes perpendicular to the degrees of liberty proper to each pad.

Furthermore, the embodiment represented in FIG. 1 offers the advantage of making possible an overall displacement of the object in the direction of movement of the fingers. This being the case, it is also possible, while allowing for the shape of the object, to command a slight movement of the object in another direction by differentiated movements of the three fingers.

If a possibility for the sliding of the pads 22a, 22b and 22c on their axes of rotation is added to the degrees of liberty of orientation of the object as defined above, it is then possible to perform movements of small amplitude by having six degrees of liberty, while the condition of isostaticity of the assembly consisting of the object, pads, fingers and frame makes it possible to move the object without slippage and without loss of contact between the pads and the object. An embodiment of such a gripper will be described further on in reference to FIGS. 8 and 9.

If it is desired to grip objects of small dimensions, the gripper of FIG. 1 quickly becomes unsuitable because, due to the parallel displacements of the fingers 10a, 10b and 10c, the contact points of the pads 22b and 22c cannot in any case come closer together than the distances between the two screws which guide and drive them.

Figure 3:
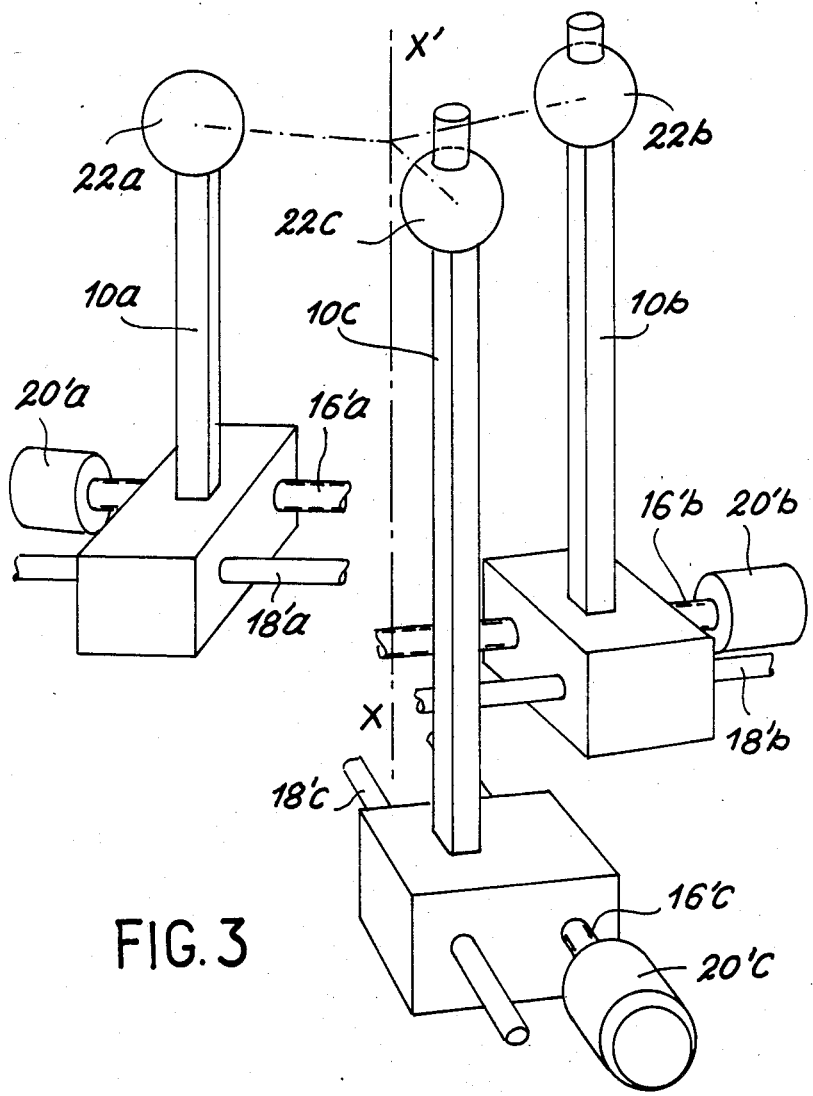
FIG. 3 is a perspective view comparable to FIG. 1 showing another embodiment of a tridigital gripper of three contact pads in accordance with the invention.

For this reason, a variant embodiment of the gripper of FIG. 1 is shown in FIG. 3, in which the fingers 10a, 10b and 10c, which are always parallel to one another, are subject to radial translatory movements at, for example, 120° from one another, with respect to a rotational axis of symmetry of order three XX'. To this effect, the drive screws 16'a, 16'b and 16'c, as well as the guiding rods 18'a, 18'b and 18'c, are disposed radially as shown in FIG. 3. The screws and the rods must then be placed at different levels along the axis XX', such that the fingers 10a, 10b and 10c must be of different lengths if it is desired that the pads 22a, 22b and 22c be placed at the same level.

For the sake of clarity, the base piece in which the screws, guiding rods and motor-reducers 20'a, 20'b and 20'c acting on the screws are contained have not been shown in FIG. 3. As in the embodiment of FIG. 1, the isostatic character of the object-pad-finger-frame assembly is achieved by placing a resilient means, such as a spring, between the finger 10a and the motor-reducer 20'a.

It can be seen that, in the embodiment of FIG. 3, the three fingers move radially toward the axis XX' in the gripping action, which permits an object of minimal cross section to be gripped between the pads 22a, 22b and 22c.

In the embodiments of FIGS. 1 and 3, the gripping action can be controlled by means of a single actuator. Thus, if the prior position of two of the fingers is suitable, an object can be gripped by operating the actuator controlling the third finger. However, the object can be gripped by tightening the third finger only when it is in contact with the first pads. In other words, the gripper cannot grasp the object without the danger of moving it or of applying some, even though slight, stress to it.

On the other hand, the mechanical structure of a gripper including only one actuator is particularly simple. In particular, when a radial grip is exercised, as in FIG. 3, the translatory movement of the fingers along the screws and guiding rods can be replaced either by a system of parallel fingers mounted on deformable parallelograms, or by pivoting fingers. A gripper having a simpler gripping movement, adapted to smaller objects and permitting them to be gripped by a single mechanical control, can be made. An example of the embodiment of such a gripper is represented in FIG. 4.

Figure 4:
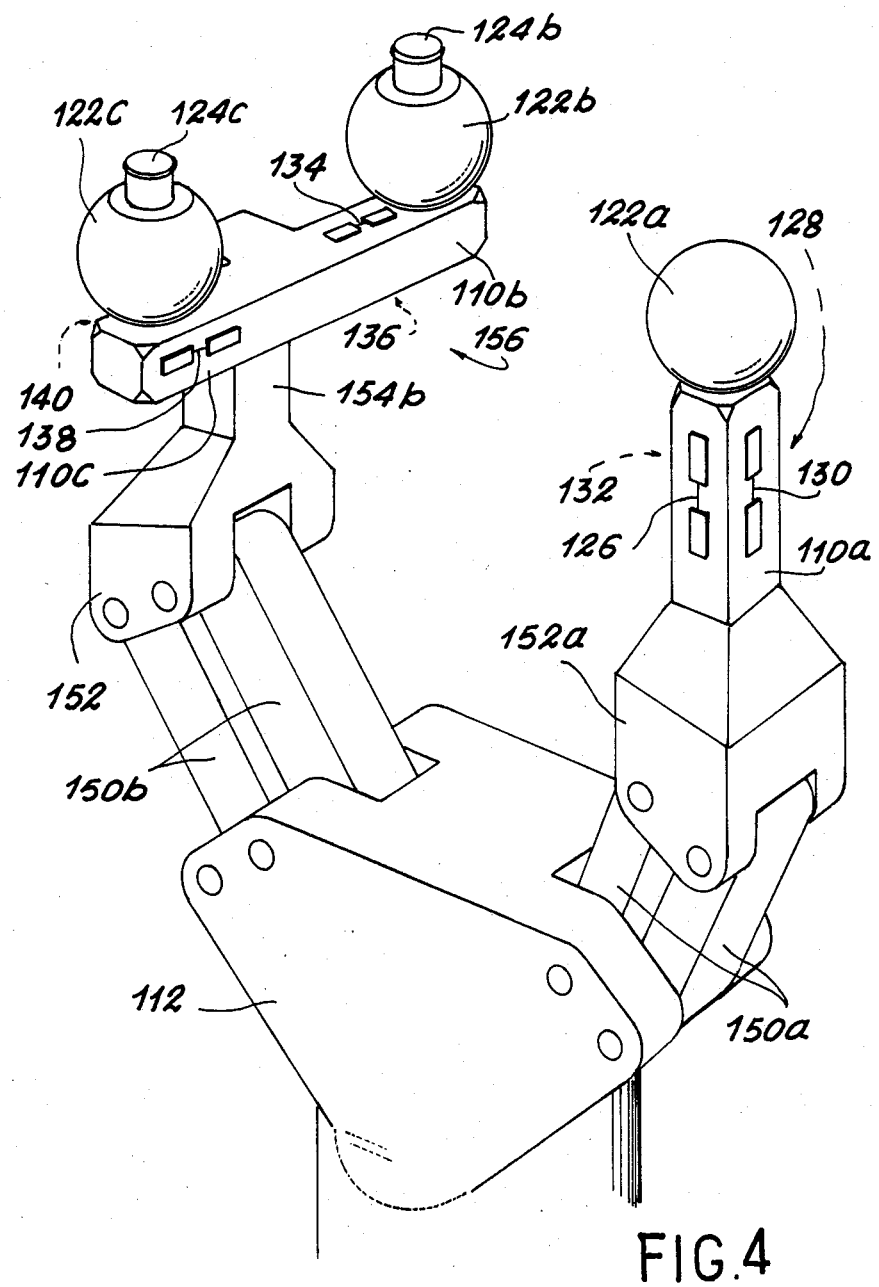
FIG. 4 is a perspective view representing a bidigital gripper of three contact pads made in accordance with the invention.

More precisely, a bidigital gripper permitting a three-point grip by means of a single actuator is represented in FIG. 4.

In a manner well known in remote manipulation, the gripper of FIG. 4 includes a base piece 112 on which two small parallelograms are articulated, each formed by two connecting rods 150a and 150b operating in flexion and torsion, respectively, on each of the finger-bearing blocks 152a and 152b.

Usually, this type of pincer terminates in removable fingers mounted on the blocks 152a and 152b and provided with planar elastomeric or metallic bearing surfaces, or else V-shaped jaws. In accordance with the invention, the blocks 152a and 152b bear, respectively, one finger 110a similar to finger 10a in FIG. 1, and an extension 154b bearing pads 122b and 122c similar to the pads 22b and 22c of FIG. 1, through the medium of a single crossbar 156b. The extension 154b remains constantly parallel to the finger 110a under the effect of the parallelograms defined by the connecting rods 150a and 150b. The crossbar 156b is held at the middle on the extension 154b, perpendicular to the plane passing through the latter and through the arm 110a, and carries at its extremities the pads 122b and 122c. The two arms 110b and 110c thus formed on the crossbar 156b are thus equivalent to the fingers 10b and 10c in FIG. 1.

As in the embodiment of FIG. 1, the finger 110a bears a fixed, pseudospherical pad 122a. Likewise, the pads 122b and 122c are mounted for rotation on the axes 124b and 124c, respectively, which are parallel to the extension 154b. Of course, the systems described above with reference to FIGS. 2a and 2b could also be transferred to the embodiment of FIG. 4.

In accordance with the invention, the gripper is rendered isostatic by the introduction of a resilient element between the actuating device associated with the frame 112 and the finger 110a, this element being deformable in the direction corresponding to the tightening of this finger.

The supporting of the pads 122b and 122c by the extension 154b could be achieved in a different manner, particularly by means of two parallel fingers disposed in the prolongation of the axes 124b and 124c.

In the same manner as described in conjunction with FIG. 1, the strain gauges are mounted preferably on the finger 110a and on parts 110b and 110c of the crossbar 156b so as to determine the combination of efforts as well as the tightening effort. In particular, two strain gauge bridges 126-128 and 130-132 (of which only gauges 126 and 130 are visible) are provided on the finger 110a, constituting a tridimensional strain detector. Part 110b of the crossbar 156b can include, in turn, a strain gauge bridge 134-136 (only gauge 134 being visible) measuring the force along the axis 124b of the pad 122b. The portion 110c of the crossbar 156b then bears a gauge bridge 138-140 (only gauge 138 being visible) measuring the effort perpendicular to the axis 124c. The combination of the two gauge bridges borne by the crossbar permits measurement of the force in the direction defined by the crossbar.

In a redundant configuration, each of the portions 110b and 110c of the crossbar 156b can include two gauge bridges, thus permitting verifications by symmetry for the calibration of the whole.

As in the preceding embodiments, it is possible to control the orientation of the object within the gripper on the basis of elongation movements parallel to the extension 154b or to the finger 110a, or rotatory movements of pad 122a about an axis parallel to this direction of elongation.

Up to now, the different embodiments described relate to grippers of three points of contact. However, the invention also applies to grippers having a greater number of points of contact.

Figure 5:
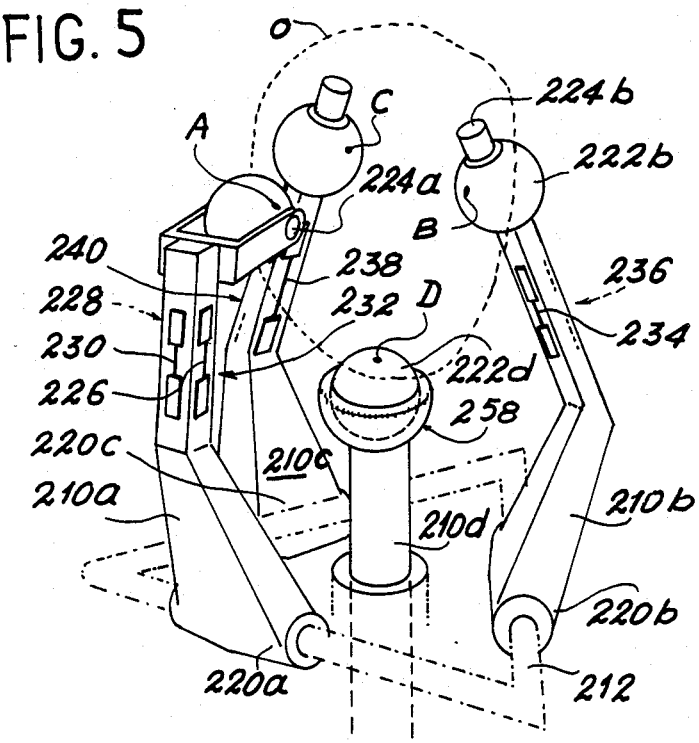
FIG. 5 is a perspective view of a four-contact-tip gripper made in accordance with the invention.

Thus, as shown in FIG. 5, the gripper of the invention can also have four points of contact. This gripper is particularly adapted for grasping objects of a shape approaching the spherical which could not be grasped by means of the grippers described above, because the application of a strong gripping effort would risk the danger of the object's slipping out and falling.

In the embodiment shown in FIG. 5, the contact points A, B, C and D defined by the gripper approximate the four apexes of a tetrahedron. Points A, B and C are obtained by the three pads 222a, 222b and 222c mounted on the ends of three articulated fingers 210a, 210b and 210c coming in contact with the object O. Point D is obtained by contact with a new pad 222d, supported by an additional finger 210d which, in the form represented in FIG. 5, is a telescoping finger.

The reference numbers are the same as those used in FIG. 1, augmented by 200. Thus, there is again the base piece 212 of the gripper, which here is represented diagrammatically in the form of a triangle on which the three fingers 210a, 210b and 210c are articulated. The pivoting of each finger on piece 212 is controlled by means of an actuator 220a, 220b and 220c. Each of the fingers is bent toward the finger 210d, so as to be able to contain an object O of approximately spherical shape, without risking accidental contact with the finger proper. Each finger 210a, 210b and 210c thus defines a plane perpendicular to its pivot axis and is disposed radially with respect to the axis of the gripper, which coincides with the axis of the fourth finger 210d.

The contact pad 222a defines a point contact with friction, of four degrees of liberty. To this end, it appears in the form of a pseudosphere mounted for rotation about an axis 224a substantially perpendicular to the plan of finger 210a. The pivot axis of the pad 222a is thus approximately parallel to the pivot axis of the finger 210a.

In the same manner as the pads 22b and 22c in FIG. 1, the pads 222b and 222c define each four degrees of liberty for the object O. More precisely, they are constituted by pseudospheres mounted rotatably on the axes 224b and 224c respectively disposed in the prolongation of the straight end of the corresponding finger. The axes 224b and 224c are thus approximately orthogonal to the pivot axes of the fingers which support them.

When the object to be gripped is inside of the gripper of FIG. 5, after the three pads 222a, 222b and 222c have been brought into contact with it, the object can no longer pivot. Indeed, if the pad 222a were to be pivoted about an axis similar to the pivot axes of pads 222b and 222c, the object would be able to revolve about an axis approximately coinciding with the axis of symmetry of the gripper. However, mounting the pad 222a on an axis which does not intersect this axis of symmetry prevents such rotation of the object.

In the embodiment shown in FIG. 5, the object O, of approximately spherical shape, is therefore unable to have any rotatory movement when it is in contact with friction with the pads 222a, 222b and 222c. Bearing this in mind, it is preferable, in accordance with the invention, for the fourth point of contact defined by the pad 222d to define five degrees of liberty and serve only to transmit the tightening effort. Consequently, the pad 222d is preferably composed of a true sphere mounted in a spherical bearing 258.

On account of the structure which has just been described with reference to FIG. 5, it can be seen that, by exercising a tightening effort on the telescoping finger 210d, the object O is brought to bear at four points A, B, C and D, similar approximately to the four apexes of a more or less regular tetrahedron. A firm grip is thus achieved about the object, which offers very interesting advantages with respect to the three-point gripper previously described. In particular, if all the points of contact are at the apexes of a tetrahedron, it can be seen that one has the best lever arm possible for exerting a torque on the object O at each of these points of contact.

It will be noted otherwise that, in accordance with the chief feature of the invention, the total number of degrees of liberty of each of the points of contact is equal to 17, which satisfies the formula expressed above. Furthermore, the embodiment represented in FIG. 5 corresponds to the best possible configuration, according to which only one tightening stress is applied to the system consisting of the object and gripper. Otherwise, the condition of isostaticity is fulfilled by placing a tension spring between one of the actuators 220a, 220b and 220c and the corresponding finger 210a, 210b and 210c, or by placing a spring between finger 210d and its actuator.

This configuration permits the best arrangement of strain gauges to determine the combined efforts. Thus, it can be seen that it is possible, by means of a strain gauge bridge 226, 228 (only gauge 226 being visible) placed on the finger 210a, to measure the stress applied along the pivot axis of the pad 220a. Likewise, another bridge of strain gauges 230, 232 (only gauge 230 being visible) mounted on the other faces of finger 210a permits measuring the effort applied perpendicular to the axis of the end of the finger, in the plane of the latter. It is not useful to measure the traction effort along finger 210a, which is accessible via the linear combination between these two strain gauge bridges, on account of the degree of liberty conferred upon pad 222a about its axis of rotation.

In the same manner, a bridge of gauges (only gauge 234 being visible) is mounted on the arm 210b in order to measure the thrust effort at B in the plane of the finger, and the traction effort along the pivot axis of the pad 222b. Lastly, a bridge of strain gauges 238, 240 (only gauge 238 being visible) is mounted on the opposite faces of the upper segment of finger 210c, so as to enable the same measurements to be made on the latter.

Thus, six measurements are made on the three fingers 210a, 210b and 210c, these measurements being orientated according to the degrees of liberty allowed to the pads. Thus, a measurement is made of the effort applied along the pivot axis of each pad and a radial measurement perpendicular to this axis. Lastly, pad 222b, which corresponds to the equivalent of a thrust without friction due to its spherical bearing 258, is the object of a measurement of pressure along the axis of thrust of the telescoping finger 210d.

Thus the seven measurements are obtained, which are needed to determine, without redundancy, the six givens of the combination of efforts and the tightening effort, which here is obtained directly by measuring the pressure along the finger 210d.

Of course, as has already been mentioned in connection with the gripper of FIG. 1, the degrees of liberty permitted by the contact pads as described with reference to FIG. 5 make it possible to measure the combined efforts in the most uncoupled manner possible in the fingers of the gripper. However, the invention is not limited to this optimum solution, and it also relates to any gripper in which the contact pads define a slightly lower number of degrees of liberty, provided that the number of degrees of liberty of the object-pads-fingers-frame assembly remains equal to $6(n-1)$.

Thus, it is possible particularly to consider making one of the pads 222b and 222c fixed, while retaining the degrees of liberty described above in pads 222a and 222d. A second torsion spring is then placed between the second actuator and the corresponding finger. In the same conditions of isostaticity, it is also possible to consider eliminating one degree of liberty of pad 222d by replacing it with a pad mounted for rotation on an axis of rotation parallel to the plane formed by the base 217 but not passing through any of the fingers 210a, 210b and 210c. Pursuing this reasoning, all of the pads described can be replaced with pads of pseudospherical shape affixed to the corresponding arms, provided that each elimination of one degree of liberty between a pad and the object is compensated by the introduction of an additional degree of liberty between an actuator and the corresponding finger. The maximum strains are then introduced while nevertheless assuring a very good grasping of the object. The resolution of the combination of efforts and of the tightening effort then requires making measurements of tridimensional efforts on each of the fingers and requires very complex calculations, since it is necessary to take into account both the geometrical positions of the four points of contact and of the resilience proper to each element of the gripper.

As already mentioned previously, the gripper of FIG. 5 is designed such that the object is positioned in the gripper by acting on the three fingers 210*a*, 210*b* and 210*c*, whereas the tightening of the object can be performed by acting only on the telescoping finger 210*d*. To this effect, this last finger is preferably provided with a thrust spring permanently urging the pad 222*d* against the object.

Bearing in mind this remark, it can be seen that it is also possible, if the three actuators 220*a*, 220*b* and 220*c* are independent, to displace the object while maintaining its contact with pad 222*d* by means of the spring which is associated with it. A certain movement of the object can thus be obtained.

In the foregoing description, the pad 222*d* of five degrees of liberty has been described as constituted by a hard sphere mounted in a spherical bearing generally in the form of a bed of balls or of a fluid bearing. This design of pad 222*d*, however, is not limitative, and it can be seen by referring to FIGS. 6*a* and 6*b* that the pad of five degrees of liberty can also be made differently.

Figure 6A:
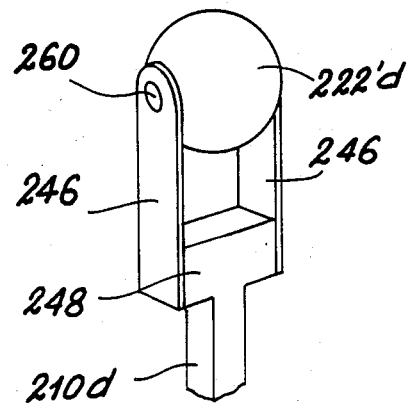
FIGS. 6a and 6b are perspective views on a larger scale showing two variant embodiments of the contact pad of five degrees of liberty of the gripper of FIG. 5.

Thus, in FIG. 6*a*, a pad 222'*d* has been represented, which has a pseudospherical external surface. This pad 222'*d* is mounted rotatably on a shaft 260 disposed parallel with an end block 248 affixed to the finger 210*d*, the shaft 260 being connected to the block 248 by two leaf springs 246, parallel and of the same length, defining a deformable parallelogram with axis 260 and with the block 248. It can be seen that this variant embodiment of FIG. 6*a* is similar to the variant embodiment of the pad of four degrees of liberty of FIG. 2*b*, the additional degree of liberty being obtained by mounting the pad for rotation on a shaft 260 connected to the corresponding finger by the two leaf springs.

Figure 6B:
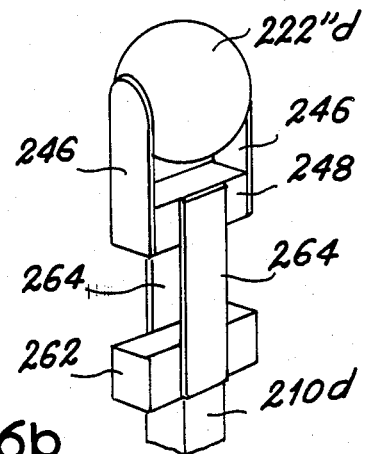

The second variant embodiment of the contact pad of five degrees of liberty represented in FIG. 6*b* is also similar to the variant of FIG. 2*b*. Thus, one again finds in this case a pad 222"*d* having a pseudospherical external surface and being connected to a block 248 disposed parallel to the axis of the pad by two leaf springs 246. In this case, the additional degree of liberty is obtained by rendering block 248 movable with respect to a block 262 affixed to the end of finger 210*d*. The blocks 248 and 262 being parallel to one another, this mobility is obtained by connecting them together by two leaf springs 264, parallel and of the same length, which define with the blocks 248 and 262 a parallelogram deformable in a plane perpendicular to the plane of the parallelogram defined by the leaf springs 246.

Referring again to FIG. 5, it will be noted that the actuator making it possible to control the finger 210*d* is preferably a hydraulic or pneumatic actuator, whereas the actuators 220*a*, 220*b* and 220*c* can be of a more common design. These last three actuators can also be replaced by a single actuator commanding simultaneously the closing of the three fingers, for example by using known means of linkage. Lastly, in the particular case of the grippers designed to grasp objects of spherical shape, it may be good to synchronize the movements of the four fingers. For this purpose, the displacement of finger 210*d* performing the tightening can be commanded by an articulated device simultaneously performing the tightening of the three other fingers by well known techniques of articulated systems.

The gripper of FIG. 5, however, has the disadvantage that the amplitude of the movement of the fingers remains limited and does not permit grasping objects of very different sizes. Otherwise, since the fingers are not parallel to one another, it is necessary to know the position of each finger in order to be able to resolve the combined efforts.

Figure 7:
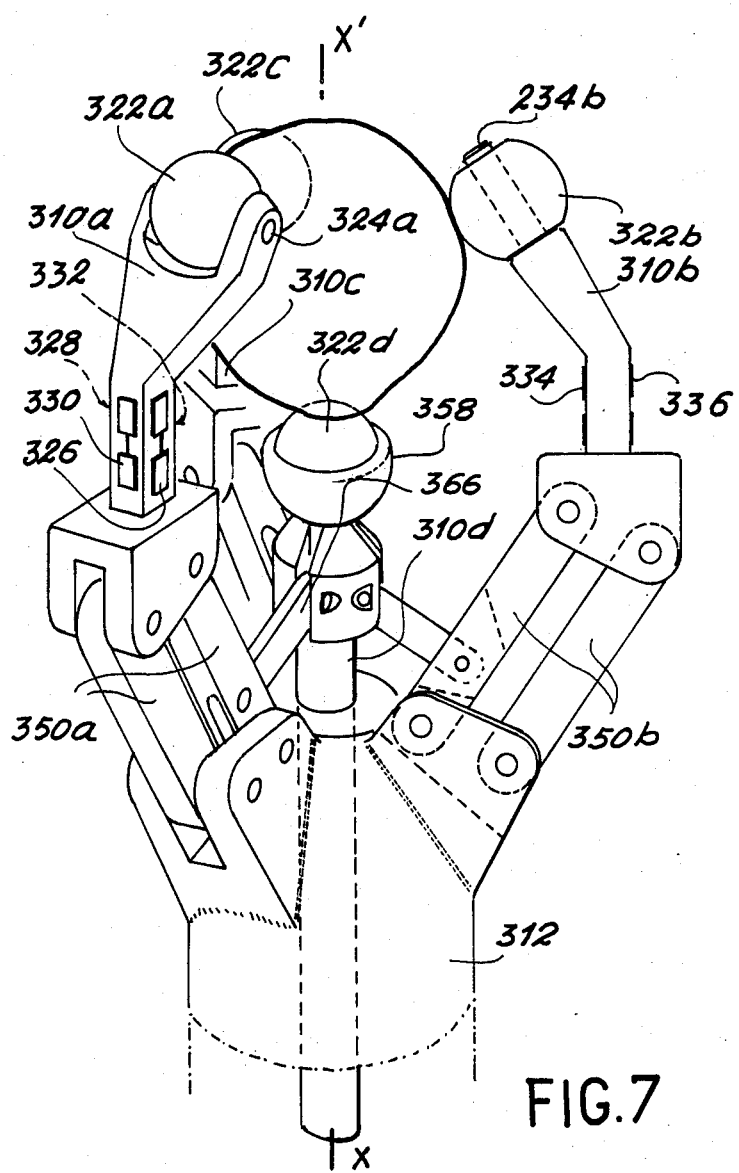
FIG. 7 is a perspective view of FIG. 5 showing a variant embodiment of a gripper of four contact pads in accordance with the invention.

To eliminate these problems, a preferred embodiment is represented in FIG. 7, of a gripper of four points of contact. In this embodiment, the three principal fingers are maintained permanently parallel to one another by means of parallelograms of the same type as those which were described before in conjunction with FIG. 4. Furthermore, the gripper of FIG. 7 has a single tightening mechanism.

As illustrated in FIG. 7, the gripper includes a base piece 312 on which three fingers 310*a*, 310*b* and 310*c* are articulated by means of three pairs of connecting rods 350*a*, 350*b* and 350*c*. Each pair of connecting rods defines a parallelogram deformable in a radial plane with respect to the ternary axis of symmetry XX' of the gripper. The three fingers 310*a*, 310*b* and 310*c* thus move parallel to one another in three radial planes situated at 120° from one another about the axis XX'.

In FIG. 7, the finger 310*c* and the connecting rods which support it are virtually invisible.

The fourth finger 310*d* is, as in FIG. 5, a telescoping finger disposed on the axis of symmetry XX'. In FIG. 7, the displacement of the finger 310*d* is coupled to that of the other three fingers by three links 366 articulated both to the finger 310*d* and to the nearer connecting rod of each pair of connecting rods 350*a*, 350*b* and 350*c*. The inclinations of these different connecting rods are calculated such that the coupling of the fingers that results enables the four pads to be brought together around an object whose size is as small as possible.

In the embodiment shown in FIG. 7, the different pads are made in a manner comparable to that which has been described with reference to FIG. 5. Thus, the finger 310*a* supports a pseudospherical pad 322*a* for rotation about a shaft 324*a* substantially perpendicular to the radial plane in which the corresponding finger moves. The pads 322*b* and 322*c* borne respectively by the fingers 310*b* and 310*c* are likewise of pseudospherical shape and mounted pivotingly on shafts such as 324*b* situated in the prolongation of the upper part of the corresponding finger, that is, in the radial plane of displacement of the finger, at approximately 60° with respect to the axis of symmetry XX'. Lastly, the pad 322*d* borne by the finger 310*d* is constituted by a rigid sphere held in a spherical bearing 358.

Otherwise, the condition of isostaticity of the assembly is achieved, as in FIG. 5, by placing, for example, a compression spring between the pad 322*d* and the portion of finger 310*d* on which the connecting rods 366 are articulated.

The embodiment of FIG. 7 has the advantage of permitting the placement of strain gauges serving to determine the combined efforts at the level of the base of each of the fingers 310*a*, 310*b* and 310*c*, that is, in directions remaining constantly parallel or orthogonal to the axis of symmetry XX' of the gripper.

Thus, gauges 326 and 328 (only gauge 326 being visible) are found on the finger 310*a*, which measure the effort perpendicular to the plane of displacement of this finger, and gauges 330 and 332 (only gauge 330 being visible) which measure the effort in the plane parallel to the axis of symmetry XX'. Likewise, the finger 310*b* bears in its portion parallel to the axis XX', strain gauges 334 and 336 measuring the effort in the plane of displacement of finger 310b, in a direction perpendicular to the axis XX' and in the direction of traction. Lastly, gauges (not shown) are likewise placed on the portion of finger 310c parallel to the axis XX', in order to perform the same type of measurement as on the arm 310b.

In FIGS. 8 and 9 there is represented an improved embodiment of the invention, in which the gripper has six additional degrees of liberty, controlled independently by six actuators.

The gripper of FIG. 8 includes a frame 412 on which are mounted three identical modules. Each of these modules is composed of a tightening motor-reducer 420a, 420b and 420c, the case of which is affixed to the frame 412; a finger 410a, 410b, 410c mounted pivotingly on the frame 412 through the medium of a corresponding motor-reducer, and a contact pad 322a, 322b and 322c mounted at the end of the corresponding finger.

The articulation axes of the fingers 410a, 410b and 410c on the frame 412, which correspond to the shafts of the motor-reducers, are disposed so as not to introduce additional parasitic movements of the object O gripped by the pads. To this end, it is necessary especially to prevent the points of contact between the object and the pads from being in a plane parallel to that of the pivoting axes of the fingers, these last being parallel and aligned in pairs, or to prevent two points of contact from defining a segment parallel to the axis of articulation of the third finger, the axes of the fingers being parallel to one another and aligned in pairs.

In the embodiment represented in FIG. 8, each of the pads 322a, 322b, 322c can be considered as affixed to the end of the corresponding finger. Its substantially hemispherical form enables it to make point contact with an object of any shape defining with this object a connection by friction with three degrees of liberty. In order to satisfy the condition of isostaticity, each of the motor-reducers 420a, 420b and 420c therefore actuates the corresponding finger through the medium of a resilient torsion element (spring).

The embodiment in FIGS. 8 and 9 differs essentially from the foregoing due to the fact that the gripper has six additional degrees of liberty making it possible, by means of associated actuators, to orientate and position by movements of small amplitude the object gripped O with respect to the base 412 of the gripper, without an action on the motor-reducer units 420a, 420b and 420c controlling the tightening and opening. Recall that such a possibility is permitted by the isostatic character of the gripper.

In FIG. 8, each of the fingers includes a motor unit 470a, 470b and 470c controlling the translation of the corresponding pad 422a, 422b and 422c along the longitudinal axis of the finger, and a motor unit 472a, 472b and 472c controlling the rotation of the corresponding pad about this axis. To this effect, each of the fingers includes a first portion 410'a, 410'b and 410'c driven in rotation by the corresponding unit 420a, 420b and 420c and supporting the case of the motor unit 470a, 470b, 470c, respectively. The case of the motor unit 472a, 472b and 472c is held slidingly in the first portion 410'a, 410'b and 410'c, on an axis perpendicular to the axis of the corresponding unit 420a, 420b and 420c which defines the axis of the finger.

A rack 474a, 474b and 474c is affixed to each of the cases of the motor units 472a, 472b and 472c, parallel to the axis of the finger. A pinion (not shown) affixed to the output shaft of each of the motor-reducers 470a, 470b and 470c meshes with the corresponding rack, such that the energizing of any of these motor-reducers has the effect of displacing the corresponding pad parallel to the axis of the finger.

The rotatory movement of each of the pads about the axis of the corresponding finger is obtained by mounting each pad 422a, 422b and 422c on the end, bent at a right angle, of a second portion in rod form 410"a, 410"b and 410"c of the corresponding finger, this portion being affixed to the output shaft of the motor-reducer 472a, 472b and 472c.

Essentially, the motor-reducer units 420a, 420b and 420c controlling the movements of the closing and opening of the fingers, the motor-reducer units 470a, 470b and 470c controlling the small-amplitude movements of the pads along the axis of the fingers, and the motor-reducer units 472a, 472b and 472c controlling the small-amplitude pivoting of the pads about the axis of the fingers, are all made in the same manner. Only one, 472a, of these units will therefore be described in greater detail in conjunction with FIG. 9.

As this figure shows, the motor-reducer unit 472a has a cylindrical case 476 in which are contained, end to end, a relative position coder (pulse generator) 484, an electric motor 478, a speed reducer 480, and an absolute angular position coder 482. More precisely, the rotor of motor 478 is affixed to a shaft 486 bearing at one end the disk 484a of the pulse generator 484 and, at its opposite end, the driving gear 480a of the reducer 480, which in this case is of the type called "harmonic drive". The driven gear 480b of this reducer is affixed to an output shaft 488. The latter is itself connected to the rod-like portion 410"a of the corresponding finger by a torsion spring 490 to provide a better resolution of the effort. The disk 482a of the position coder 482 is affixed directly on the rod 410"a.

It can be seen that, due to this configuration, it is possible, by means of the coder 482, to know the direction and the amplitude of the pivoting of the pad 422a about the axis of the finger. The pulse generator 484 on its part enables this measurement to be displayed.

It can also be seen in FIG. 9 that means are provided for detecting the coming in contact of pad 422a with the object (comparable means being, of course, provided for the pads 422b and 422c). In the example represented, this detection is made possible by connecting the pad 422a to the portion 410"a of the finger by a spring 492 of very light resilience. This spring 492, constituted in the example described by a leaf spring, holds the pad 422a away from an abutment 494 formed on portion 410"a of the finger, when the pad is not in contact with an object. Since the spring 492 moves the pad perpendicular to the axis of the finger, toward the object to be grasped, the coming of the pad in contact with the object has the immediate effect (considering the lightness of the effort exercised by the spring) of bringing the pad against the abutment 494. This situation is detected by any means, such as an analog system, or, as shown, by an all-or-nothing electrical contact 496. This system is connected to the control circuit to provide for the immediate halting of the motion.

It will be noted that this system of contact detection does not insert any additional degree of liberty at the pads, because, when an object is in the gripper, the pads are abutted against the surfaces such as 494 formed at the ends of the fingers.

Of course, the invention is not limited to the embodiments that have just been described by way of example, but covers all the variants. In particular, it will be understood that all the variant embodiments of pads of four degrees of liberty described in conjunction with FIGS. 1, 2a and 2b can be applied to pads of four degrees of liberty used in the grippers of FIGS. 5 and 7. Likewise, it will be understood that the teaching of the gripper of three points of contact in FIG. 4 can be transposed to the grippers of four points of contact of FIGS. 5 and 7, two of the three upper contact fingers being then supported by a single articulated finger.

It will also be noted that the cross-section of the fingers of the gripper, which is preferably square, can assume any other shape permitting the gauge bridges, if any, to be placed on substantially planar faces oriented so as to measure the efforts in directions making it possible to determine as simply as possible the combined efforts. The gauge bridges can also be omitted when the sum of the degrees of liberty existing between each pad and the object is less than $6(n-1)-1$. The cross section of the fingers can then be as desired.

In case of the use of nonlinear displacement contact pads, such as the pad of four degrees of liberty of FIG. 2b, or the pads of five degrees of liberty of FIGS. 6a and 6b, these displacements must be relatively short when strain gauges are used, so as not to introduce excessively great errors into the measurement of the efforts.

We claim:

1. A gripper for grasping an object of any tridimensional shape in a stable manner, said gripper having four contact pads mounted on fingers displaceably connected to a frame, said pads having means for pseudopoint contact with the object, three of said pads having no more than four degrees of liberty, and one pad having no more than five degrees of liberty, and at least one connection of one degree of liberty between the fingers and the frame, the sum of the degrees of liberty between the object and each of the pseudopoint contact means of the gripper being no more than equal to 17; and the contact pads, the fingers, the frame, and the object to be gripped constituting an isostatic assembly, such that the sum total of the degrees of liberty of the connections of said assembly is equal to 18.

2. A gripper according to claim 1, having three pads of four degrees of liberty, and one pad of five degrees of liberty, one connection of one degree of liberty between the fingers and the frame, and at least bidimensional effort detector mounted on each of the fingers bearing one pad of four degrees of liberty, and one at least unidimensional effort detector mounted on the pad of five degrees of liberty.

3. A gripper according to claim 1, wherein each pad of five degrees of liberty includes a pseudospherical piece mounted with two degrees of liberty on the respective finger.

4. A gripper according to claim 3, wherein said pseudospherical piece is a ball mounted in a spherical bearing.

5. A gripper according to claim 3, wherein said pseudospherical piece defines at least one axis of revolution and is mounted rotatingly and slidingly on a shaft passing through said axis of revolution and affixed to the respective finger, and resilient means between said piece and said finger for returning the piece toward a central portion of said shaft.

6. A gripper according to claim 2, wherein said pseudospherical piece defines at least one axis of revolution and is mounted rotatingly on a shaft passing through said axis of revolution and connected to the respective finger by two leaf springs arranged parallel to each other and having the same length, defining a deformable parallelogram.

7. A gripper according to claim 3, wherein said pseudospherical piece is affixed to two first leaf springs arranged parallel to each other and having the same length said first leaf springs being affixed to a block so as to define a parallelogram deformable in a first direction, said block being connected to the respective finger by two second leaf springs arranged parallel to each other and having the same length, so as to define a parallelogram deformable in a second direction orthogonal to the first direction.

8. A gripper according to claim 1, wherein each pad of three degrees of liberty includes a pseudospherical piece affixed to the respective finger.

9. A gripper according to claim 1, wherein each pad of four degrees of liberty includes a pseudospherical piece mounted with one degree of liberty on the respective finger.

* * * * *